(12) United States Patent
Husveg

(10) Patent No.: US 12,735,333 B2
(45) Date of Patent: Sep. 15, 2026

(54) HYDROCYCLONE

(71) Applicant: Sandcatch Solutions AS, Bryne (NO)

(72) Inventor: Trygve Husveg, Varhaug (NO)

(73) Assignee: Sandcatch Solutions AS, Bryne (NO)

( * ) Notice: Subject to any disclaimer, the term of this patent is extended or adjusted under 35 U.S.C. 154(b) by 330 days.

(21) Appl. No.: 18/711,298

(22) PCT Filed: Nov. 15, 2022

(86) PCT No.: PCT/NO2022/050263
§ 371 (c)(1),
(2) Date: May 17, 2024

(87) PCT Pub. No.: WO2023/091024
PCT Pub. Date: May 25, 2023

(65) Prior Publication Data

US 2025/0019270 A1 Jan. 16, 2025

(30) Foreign Application Priority Data

Nov. 18, 2021 (NO) .................................. 20211384

(51) Int. Cl.
*C02F 1/38* (2023.01)
*B04C 3/00* (2006.01)
*B04C 3/06* (2006.01)

(52) U.S. Cl.
CPC .................. *C02F 1/38* (2013.01); *B04C 3/06* (2013.01); *B04C 2003/003* (2013.01)

(58) Field of Classification Search
CPC ....... C02F 1/38; B04C 3/06; B04C 2003/003; B04C 5/13; B04C 2009/008; B04C 5/04;
(Continued)

(56) References Cited

FOREIGN PATENT DOCUMENTS

| | | | |
|---|---|---|---|
| EP | 3417945 | A1 | 12/2018 |
| RU | 2185245 | C1 | 7/2002 |

(Continued)

OTHER PUBLICATIONS

Ghodrat, Maryam et al., "Numerical analysis of hydrocyclones with different vortex finder configurations," Elsevier, Minerals Engineering, Aug. 2014, vol. 63, pp. 125-138.

(Continued)

*Primary Examiner* — Ekandra S. Miller-Cruz
(74) *Attorney, Agent, or Firm* — Bradley Arant Boult Cummings LLP

(57) ABSTRACT

Hydrocyclone feasible for autonomous and continuous removal of sand or other heavier particulate material from a continuous medium of liquid and sludge, merely by static control parts, wherein the hydrocyclone comprises an inlet, a hydrocyclone body with a cylindrical part and a conical part or a transitional cylinder-cone body, a reject outlet in the narrow end of the conical body and an accept outlet at the end of the cylindrical part of the hydrocyclone body, distinguished in that: the diameter of the inlet, one or several in sum, is ⅖ of the diameter of the hydrocyclone, within ±30%, or if the inlet is volute, rectangular or has other cross section shape than circular, a cross-section area of the inlet or inlets in sum corresponding to a circular inlet with diameter ⅖ of the diameter of the hydrocyclone, within ±30%; wherein the diameter of the hydrocyclone is the diameter of the cylindrical part or the diameter of the widest end of the conical part of the hydrocyclone body, the diameter of the accept outlet/vortex finder (liquid and sludge) is ⅗ of the hydrocyclone diameter, within ±30%; the diameter of the reject outlet (sand or sandy sludge) is ⅕ of the hydrocyclone diameter, within ±30%; the length of the cylindrical part of the hydrocyclone body is between 1 and 2 times the hydrocyclone diameter; the length of the conical part of the
(Continued)

hydrocyclone is between 1 and 3 times the hydrocyclone diameter; and the hydrocyclone, when in operation, is oriented with the reject outlet directed at an angle in the range 0-90° upward from horizontal.

8 Claims, 5 Drawing Sheets

(58) Field of Classification Search
CPC B04C 5/081; B04C 5/16; B04C 11/00; B04C 5/14; B04C 5/08; B04C 5/18; B01D 21/267; B01D 17/0217
USPC .......................................................... 210/788
See application file for complete search history.

(56) References Cited

FOREIGN PATENT DOCUMENTS

| | | | |
|---|---|---|---|
| WO | WO-8500990 | A1 | 3/1985 |
| WO | WO-2011130783 | A1 | 10/2011 |

OTHER PUBLICATIONS

Patent Cooperation Treaty, International Application No. PCT/NO2022/050263, "International Search Report," Feb. 1, 2023, 3 pages.
Salvador, Fernanda F. et al., "Filtering cylindrical-conical hydrocyclone," Particuology, Dec. 2019, vol. 47, pp. 54-62.
Taiwo, Muhammad I. et al., "Design and analysis of cyclone dust separator," American Journal of Engineering Research (AJER), www.ajer.org, 2016, vol. 5, Issue 4, pp. 130-134.

HYDROCYCLONE

TECHNICAL FIELD

The present invention relates to hydrocyclones. More specifically, the invention relates to a hydrocyclone for removal of sand or other relative heavier particles from a continuous medium of liquid and sludge.

BACKGROUND ART

Hydrocyclones for removal of sand or other relative heavier particles from a continuous medium of liquid and sludge operates according to one of two principles:

- With the first principle, a continuous reject flow, wherein the separated particles typically constitute a percentage of the reject flow, wherein the flow distribution between the outlets of accept and reject is governed by the geometry of the hydrocyclone or by having installed valves in one or both outlets, wherein said valves are automatic or manual valves.
- With the second principle, a batch-based reject system, wherein the reject volumes are accumulated in a particle/sand chamber, as part of the cyclone body or a separate chamber below, for periodic discharge thereof by one or more automatic or manual valves and typically a flushing system, for discharging the sand out from the chamber.

The term sludge means a thick, soft, wet mixture with solids and/or organic materials, typically used for biogas production or fertilizers, but includes any viscous mud or slurry.

In the context of the present invention, the term sand can mean not only sand but any process inactive material reducing the active volume in biogas reactor or treatment plant equipment, including materials such as sand, stones, pebbles, egg scales, shells, hard scales, concrete, ceramics, polymers, glass and metal.

It would be beneficial with a self-adjusting hydrocyclone without a continuous reject flow or a batch-based reject system, for several reasons. Less requirement for control devices, simpler and less expensive installations, less maintenance and service, would be beneficial. In addition, less dependence on feed sand concentration, flow rate and less dependence on variations in viscosity of the continuous liquid-sludge/mud would be beneficial, if possible. The objective of the present invention is to provide such self-adjusting hydrocyclone.

SUMMARY OF INVENTION

The objective is met with a hydrocyclone of the present invention.

More specifically, the invention provides a hydrocyclone feasible for autonomous and continuous removal of sand or other heavier particulate material from a continuous medium of liquid and sludge, merely by static control parts, wherein the hydrocyclone comprises an inlet, a hydrocyclone body with a cylindrical part and a conical part or a transitional cylinder-cone body, a reject outlet in the narrow end of the conical body and an accept outlet at the end of the cylindrical part of the hydrocyclone body, distinguished in that:

- the diameter of the inlet, one or several in sum, is ⅖ of the diameter of the hydrocyclone, within ±30%, or if the inlet is volute, rectangular or has other cross section shape than circular, a cross-section area of the inlet or inlets in sum corresponding to a circular inlet with diameter ⅖ of the diameter of the hydrocyclone, within ±30%; wherein the diameter of the hydrocyclone is the diameter of the cylindrical part or the diameter of the widest end of the conical part of the hydrocyclone body, the diameter of the accept outlet/vortex finder (liquid and sludge) is ⅗ of the hydrocyclone diameter, within ±30%;
- the diameter of the reject outlet (sand or sandy sludge) is ⅕ of the hydrocyclone diameter, within ±30%;
- the length of the cylindrical part of the hydrocyclone body is between 1 and 2 times the hydrocyclone diameter;
- the length of the conical part of the hydrocyclone is between 1 and 3 times the hydrocyclone diameter; and
- the hydrocyclone, when in operation, is oriented with the reject outlet directed at an angle in the range 0-90° upward from horizontal.

The hydrocyclone of the invention comprises a in essence tangential inlet (one or several), a hydrocyclone body with a cylindrical part and a conical part or a transitional cylinder-cone body, a reject outlet (also termed reject or sand outlet) in the narrow end of the conical body and an accept outlet (also termed accept or sludge/water outlet or vortex finder) at the end of the cylindrical part of the hydrocyclone body.

In some embodiments, a static restriction is preferably arranged in the reject outlet, creating a small back pressure. The static restriction can be an additional pipe section that may or may not vary in cross-sectional flow area and/or a flange covering a small part of the reject outlet diameter, the flange extending inwards from the periphery of the outlet, for example covering 5%, 10%, 20% or 40% of the diameter.

Preferably, each of the ratios specified above for the hydrocyclone of the invention, is within ±30%, ±20%, ±15%, ±10%, ±7%, ±5%, ±3%, ±2% or ±1%. More specifically, the diameter of the inlet (one or several as combined) is ⅖ of the diameter of the hydrocyclone, within ±30%, ±20%, ±15%, ±10%, ±7%, ±5%, ±3%, ±2% or ±1%; or if the inlet is volute, rectangular or has other cross section shape than circular, a cross-section area of the inlet corresponding to a circular inlet with diameter ⅖ of the diameter of the hydrocyclone, within ±30%, ±20%, ±15%, ±10%, ±7%, ±5%, ±3%, ±2% or ±1% and/or;

- the diameter of the accept outlet, also termed vortex finder (liquid and sludge) is ⅗ of the hydrocyclone diameter, within ±30%, ±20%, ±15%, ±10%, ±7%, ±5%, ±3%, ±2% or ±1% and/or;
- the diameter of the reject outlet (sand or sandy sludge) is ⅕ of the hydrocyclone diameter, within ±30%, ±20%, ±15%, ±10%, ±7%, ±5%, ±3%, ±2% or ±1%.

The diameter of the hydrocyclone is the diameter of the cylindrical part or the diameter of the widest end of the conical part of the hydrocyclone body.

Unless otherwise specified, diameters refer to diameter for flow, that is internal diameter for flow.

The axial length of the accept outlet (also termed accept or sludge/water outlet or vortex finder) at the wide end of the hydrocyclone, is equal to or longer than the dimension of the inlet or inlets along the hydrocyclone axis. Thereby, the accept outlet flow will not be disturbed by the inlet flow.

Typical operation parameters of the hydrocyclone of the invention are as follows:

Inlet pressure of 1 to 5 bar.

Back pressure on sludge/water outlet (accept), about atmospheric.

Back pressure on sand/sandy sludge (reject), about atmospheric.

The sand separation is autonomously controlled as a function of sand concentration of the inlet flow.

Sand is not flowing out from the reject outlet until a threshold quantity of sand in the hydrocyclone has been reached.

When the threshold quantity of sand in the hydrocyclone has been reached, excess sand flows out the reject outlet, with or without some sludge.

The reject flow typically is wet sand, comprising about 50% sand and 50% sludge/water.

Sand is retained in the hydrocyclone for unusual long period of time, resulting in abrading pollution and organic lighter materials from the sand.

The hydrocyclone has a washing function in addition to a separation function.

The hydrocyclone can be optimized for minimum quantity of water/sludge in the sand (reject) flow.

Autonomous separation of sand means self-adjusting separation without any active control. More specifically, the air core in combination with the liquid vortex, the sand contents in the inflow and the sand quantity accumulated in the hydrocyclone cause the hydrocyclone to autonomously open/close the reject outlet for flow as illustrated in FIGS. 3-5 and described in further detail below. As far as we know, all other hydrocyclones for continuous separation have continuous reject flow and/or must include active control to control the reject flow, such as manual or automatic valves or other adjustment arrangements that must be actively controlled during operation of the hydrocyclone.

The hydrocyclone of the invention provides significant advantages in biogas plants and treatment plants, such as sewage treatment plants, where hydrocyclones can be used for sand removal. Some of the advantages are:

No valve for reject control: lower Capex (capital expense, investment cost) and lower Opex (operations expense).

No water injection for thinning sludge or cleaning sand during operation: lower Capex and Opex.

No reject chamber: lower Capex and Opex.

No flushing system for reject chamber: lower Capex and Opex.

The hydrocyclone removes sand continuously and autonomously, without disturbing the operation. Sand catchers often removes sand discontinuously, opening and closing for emptying, disturbing the operation.

The hydrocyclone handles varying concentration of sand. The hydrocyclone sand separation/outtake is autonomously controlled by the vortex flow, which in turn is affected by the sand concentration of the inlet flow.

The hydrocyclone of the invention is in principle independent of variations in flow rate within a large operational range/within a maximum flow rate to minimum flow rate ratio of at least 3, and largely independent of changes in total solids content of the sludge, mud, or liquid in the feed to the inlet, until a total solids content of at least 10%, with reference to a procedure where a well-mixed sample is evaporated in a weighted dish and dried to constant weight in an oven at 103 to 105 degrees Celcius, and where the increase in weight over that of the empty dish represents the total solids.

The control devices of the hydrocyclone of the invention consist of static parts, that is no valves with positions or openings that must be adjusted during operation of the hydrocyclone, or no other flexible or moveable parts that must be adjusted during operation of the hydrocyclone.

Preferably, the length of the conical part of the hydrocyclone is between 1.5 and 2.5 times, or between 1.75 and 2.25 times the hydrocyclone diameter, or 1 to 1.95 times the hydrocyclone diameter.

Preferably, the length of the cylindrical part of the hydrocyclone body is between 1.25 and 1.75, or 1.3 and 1.7 times the hydrocyclone diameter, or 1 to 1.35 times the hydrocyclone diameter.

The hydrocyclone of the invention has an unusually wide diameter accept outlet/vortex finder, liquid-sludge outlet/vortex finder, unusually short length hydrocyclone body cylindrical part and unusually short length hydrocyclone body conical part.

The invention also provides use of a hydrocyclone of the invention for removal of sand or other heavier particulate material from sludge or slurries.

In addition, the invention also provides a method of removing sand autonomously from sludge or slurries, using a hydrocyclone as herein described and illustrated.

DETAILED DESCRIPTION OF THE INVENTION

Figure 1:
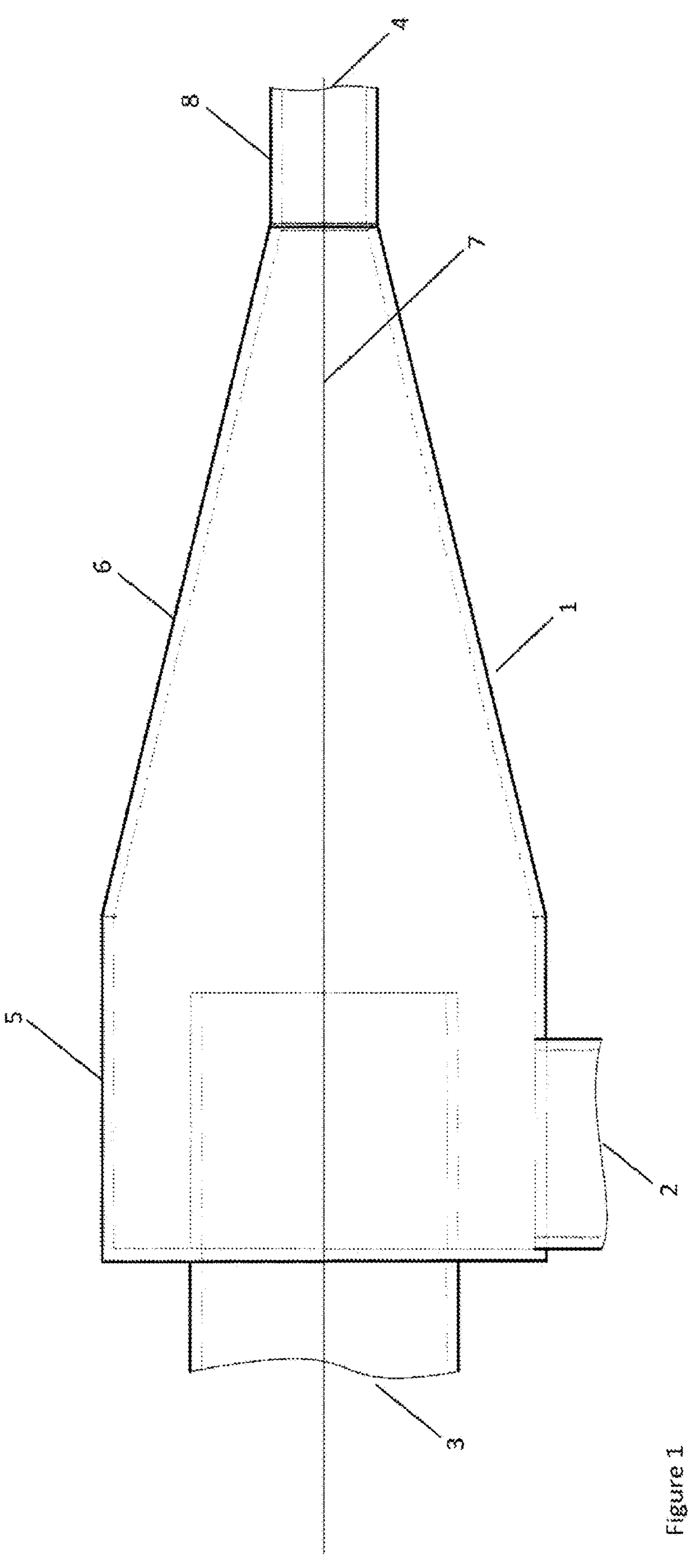
FIG. 1 illustrates a hydrocyclone according to the invention.

Reference is made to FIG. 1, illustrating a hydrocyclone 1 of the invention, comprising an inlet 2, an accept outlet (liquid/sludge outlet or vortex finder) 3 and a reject outlet (sand outlet) 4. The hydrocyclone body has a cylindrical part 5 and a conical part 6. The cyclone axis 7 is indicated on the figure. Item 8 is a static outlet restriction in the reject outlet, in the illustrated embodiment a short additional pipe section.

Figure 2:
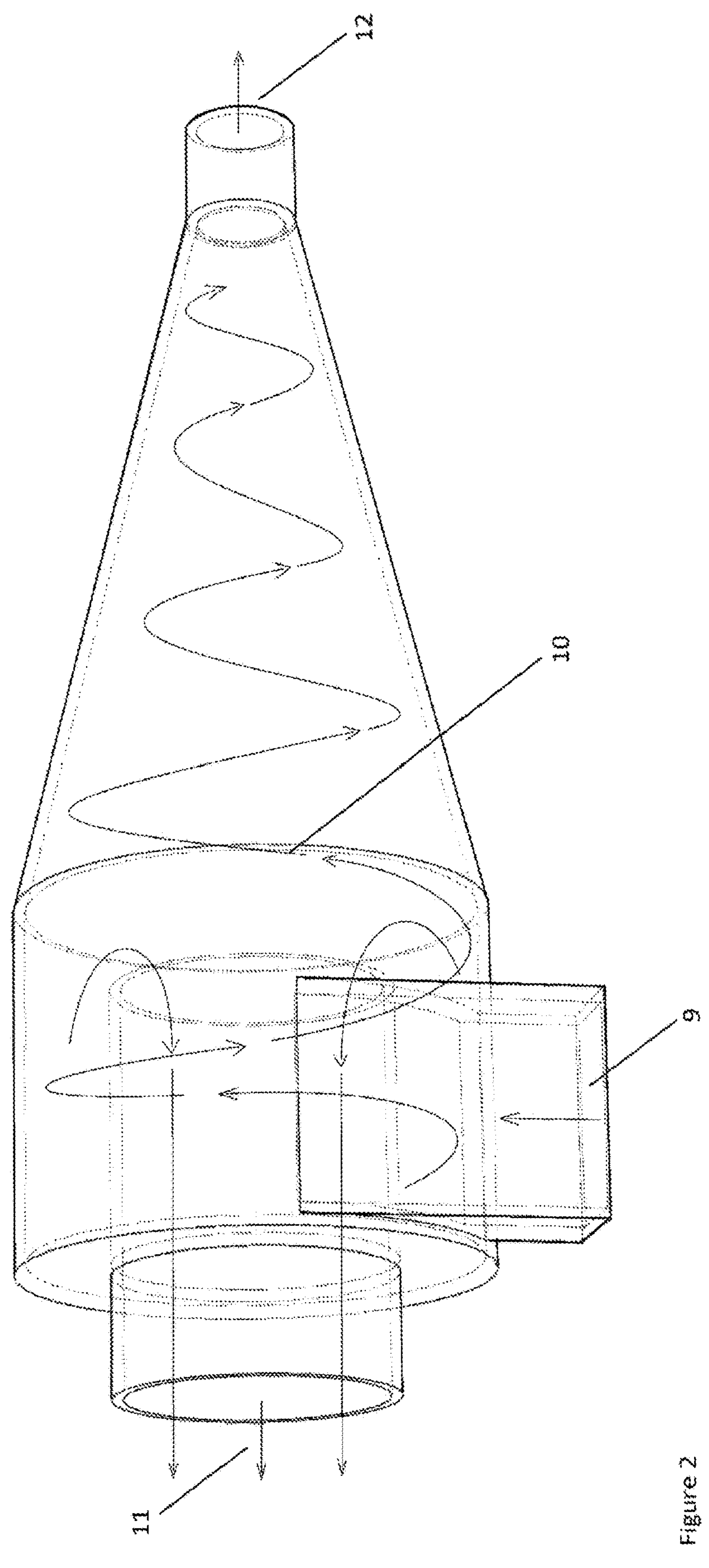
FIG. 2 illustrates the flow pattern in the hydrocyclone.

FIG. 2 illustrates the flow pattern in the hydrocyclone of FIG. 1. The inlet flow 9 is in essence tangential, as normal for hydrocyclones. The cyclonic flow 10, a vortex flow, is illustrated inside the hydrocyclone body. The accept outlet, the liquid-sludge outlet flow 11, is illustrated as arrows in the wide end of the hydrocyclone and the reject outlet 12, the sand outlet flow, is illustrated as an arrow in the narrow end of the hydrocyclone.

Figure 3:
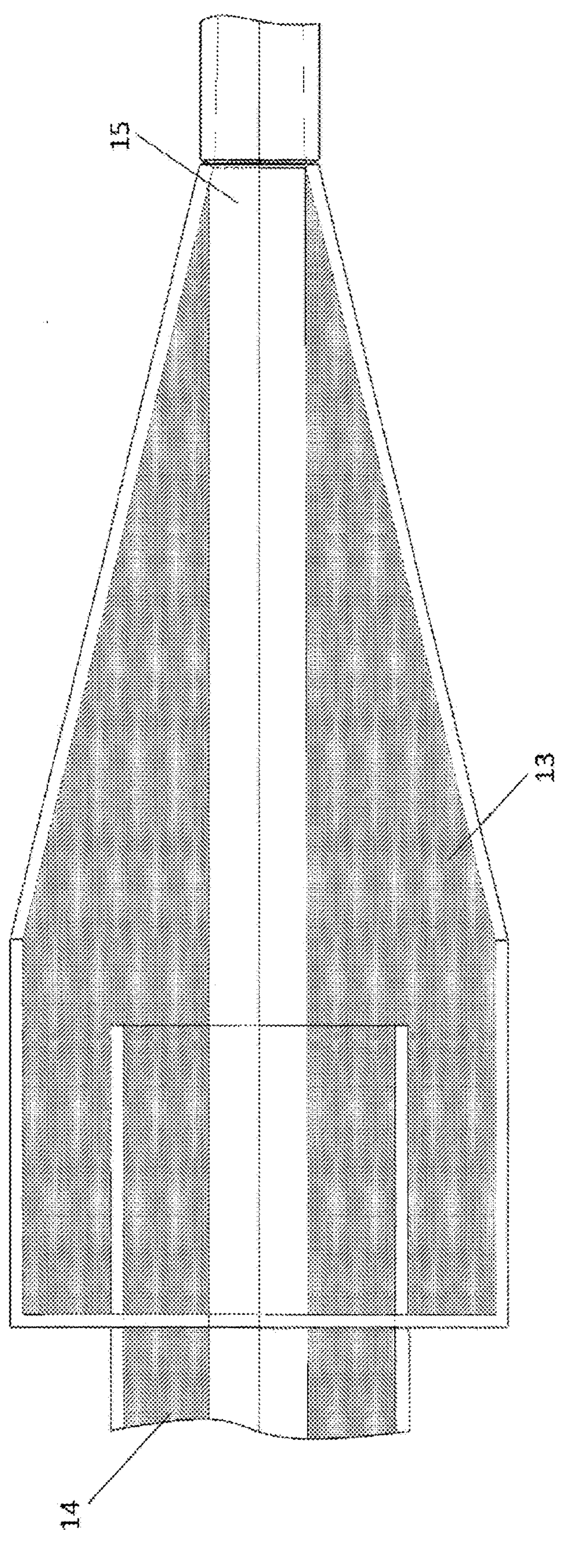
FIG. 3 illustrates a longitudinal section of the hydrocyclone in operation, with only liquid in the inlet flow.
Figure 4:
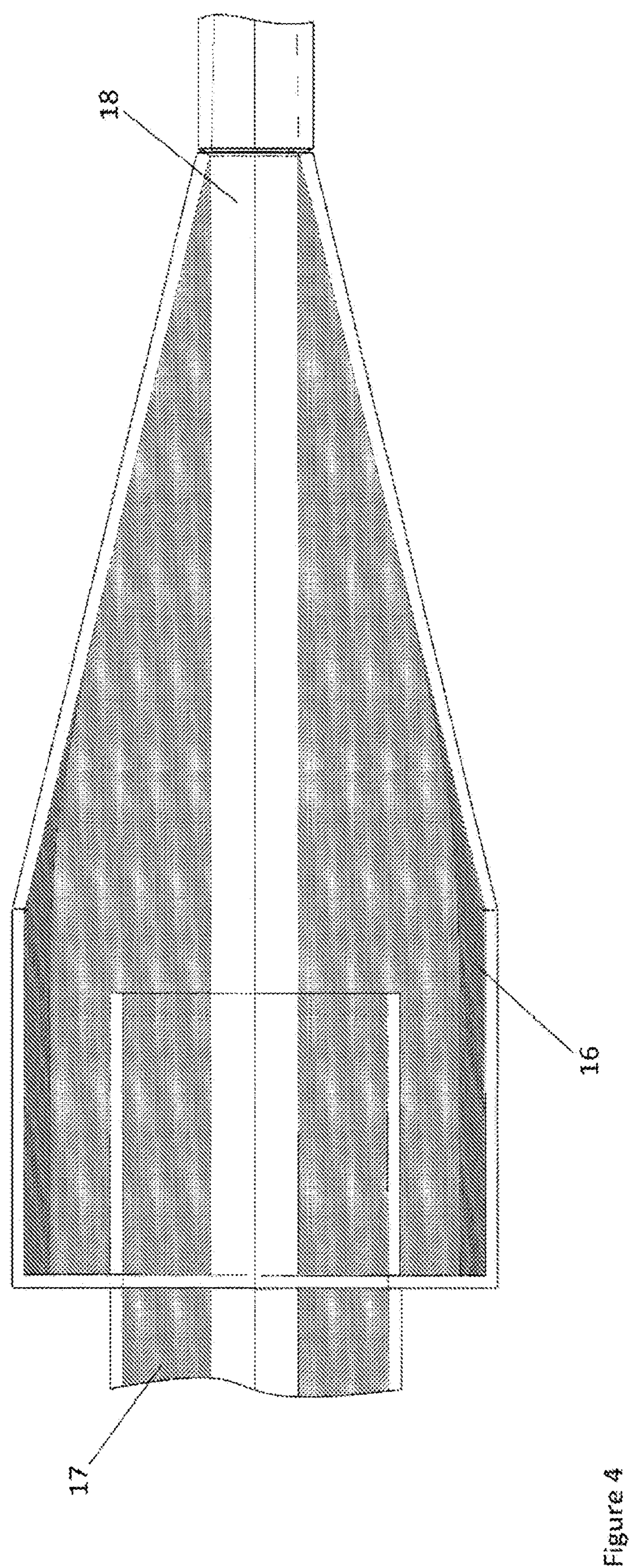
FIG. 4 illustrates a longitudinal section of the hydrocyclone in operation, with liquid and some sand in the inlet flow.
Figure 5:
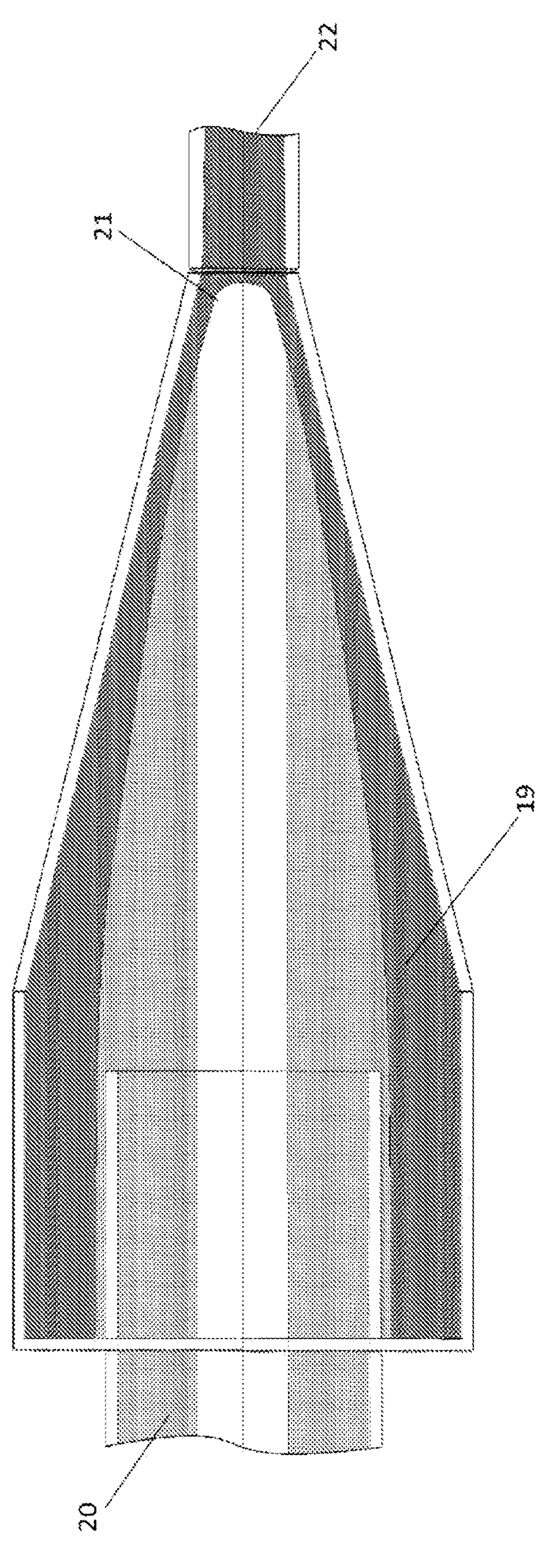
FIG. 5 illustrates a longitudinal section of the hydrocyclone in operation, with liquid and more sand in the inlet flow.

FIGS. 3, 4 and 5 illustrate operation of the hydrocyclone of the invention with increasing sand contents in the inlet flow. For clarity, the inlet is not illustrated.

In FIG. 3, with only liquid in the inlet flow, the liquid forms a vortex 13 inside the hydrocyclone. The liquid can flow from the accept outlet at 14 but the liquid cannot flow out of the reject outlet due to air core 15. At least one of the reject outlet and the accept outlet is open for air ingress, alternatively the inlet flow includes air.

In FIG. 4, some sand is included in the inlet flow. The sand is illustrated as the outermost part 16 of the vortex flow, the darker component thereof. Liquid can still flow out from the accept outlet, at 17, whilst an air core 18 still closes the reject outlet for flow.

In FIG. 5, more sand is included in the inlet flow. The liquid and sand still form a vortex 19, but the sand constitutes a larger part of the vortex. Liquid can still flow out from the accept outlet, at 20. However, the air core 21 no longer close the reject outlet from sand flowing out, and sand can flow out from the reject outlet, illustrated as 22. Accordingly, the sand vortex has "grown" to reach the reject outlet, as illustrated by the darker, outer vortex component reaching the reject outlet.

The invention claimed is:

1. A hydrocyclone for removal of sand or other heavier particulate material from a continuous medium of liquid and sludge, the hydrocyclone comprising:

at least one inlet;

a hydrocyclone body with a cylindrical part and a conical part or a transitional cylinder-cone body;

a reject outlet in the narrow end of the conical body and an accept outlet at the end of the cylindrical part of the hydrocyclone body;

wherein the diameter of the at least one inlet is ⅖ of the diameter of the hydrocyclone, within ±30%, or when the at least one inlet is volute, rectangular or has other cross section shape than circular, a cross-section area of the at least one inlet corresponding to a circular inlet with diameter ⅖ of the diameter of the hydrocyclone, within ±30%;

wherein the diameter of the hydrocyclone is the diameter of the cylindrical part or the diameter of the widest end of the conical part of the hydrocyclone body, the diameter of the accept outlet or vortex finder is ⅗ of the hydrocyclone diameter, within ±30%;

wherein the diameter of the reject outlet is ⅕ of the hydrocyclone diameter, within ±30%;

wherein the length of the conical part of the hydrocyclone is between 1 and 3 times the hydrocyclone diameter;

wherein the length of the cylindrical part of the hydrocyclone body is between 1 and 2 times the hydrocyclone diameter;

wherein the control devices consist solely of static, non-adjustable parts, thereby functioning autonomously and continuously;

wherein the hydrocyclone, when in operation, (1) is oriented with the reject outlet directed upward from horizontal and (2) is configured for automatous and continuous removal of sand or other heavier particulate material from a continuous medium comprising liquid and sludge.

2. The hydrocyclone according to claim 1, comprising a static restriction in the reject outlet, creating a small back pressure.

3. The hydrocyclone according to claim 2, wherein the static restriction comprises a pipe section having a cross-sectional flow area.

4. The hydrocyclone according to claim 2, wherein the static restriction comprises a flange covering a small part of the diameter, the flange extending inwards from the periphery of the outlet, covering 5%, 10%, 20% or 40% of the diameter.

5. The hydrocyclone according to claim 1, wherein each of the ratios specified above for the hydrocyclone of the invention, is within ±20%, ±15%, ±10%, ±7%, ±5%, ±3%, ±2% or ±1%.

6. The hydrocyclone according to claim 1, wherein the length of the conical part of the hydrocyclone is between 1.5 and 2.5 times the hydrocyclone diameter.

7. The hydrocyclone according to claim 1, wherein the length of the cylindrical part of the hydrocyclone body is between 1.25 and 1.75 times the hydrocyclone diameter.

8. A method of removing sand or other heavier particulate material from a continuous medium of liquid and sludge, comprising:

flowing the continuous medium of liquid and sludge into the at least one inlet of the hydrocyclone according to claim 1;

separating sand or heavier particulate material from the continuous medium by operation of the hydrocyclone; and discharging the sand through the reject outlet.

* * * * *